United States Patent [19]

Eidt, Jr. et al.

[11] Patent Number: 5,652,284

[45] Date of Patent: Jul. 29, 1997

[54] THERMOPLASTIC ELASTOMER-ASPHALT NANOCOMPOSITE COMPOSITION

[75] Inventors: Clarence Martin Eidt, Jr., Mendham; Martin Leo Gorbaty, Westfield; Chester W. Elspass, Alpha; Dennis George Peiffer, Annandale, all of N.J.

[73] Assignee: Exxon Research & Engineering Company, Florham Park, N.J.

[21] Appl. No.: 556,151

[22] Filed: Nov. 9, 1995

[51] Int. Cl.$^6$ ............................................. C08L 95/00
[52] U.S. Cl. ......................... 524/64; 524/68; 524/59; 524/70; 524/62
[58] Field of Search ................. 524/64, 68, 70, 524/59, 62

[56] References Cited

U.S. PATENT DOCUMENTS 4,332,620   6/1982   Quinn ........................... 524/64

OTHER PUBLICATIONS

"Molecular Weight Determination," Encyclopedia of Polymer Science and Engineering (1987 ed.), pp. 1–3 of vol. 10.

*Primary Examiner*—Melvyn I. Marquis
*Attorney, Agent, or Firm*—Joseph J. Dvorak; Linda M. Scuorzo

[57] ABSTRACT

A composite material is provided comprising an elastomer, from about 0.1 wt % to about 15 wt. % of a layered mineral based on the weight of the total composition and from about 0.1 wt. % to about 15 wt. % of asphalt based on the weight of the total composition.

7 Claims, 3 Drawing Sheets

THERMOPLASTIC ELASTOMER-ASPHALT NANOCOMPOSITE COMPOSITION

FIELD OF THE INVENTION

This invention relates generally to the field of composite materials and more particularly to elastomeric nanocomposite materials having improved mechanical properties.

BACKGROUND OF THE INVENTION

Layered clay minerals such as montmorillonite are composed of silicate layers with a thickness of about 1 nanometer. Dispersions of such layered materials in polymers are frequently referred to as nanocomposites.

Recently, there has been considerable interest in forming nanocomposites as a means to improve the mechanical properties of polymers. Incorporating clay minerals in a polymer matrix, however, does not always result in markedly improved mechanical properties of the polymer. This may be due in part to the inability to exfoliate all or at least a substantial portion of the layers of the layered silicate material. It may also be due in part the lack of affinity between the layered silicate materials and the organic polymers. Attempts to overcome these problems have not been totally successful. Moreover, composites present unique problems not encountered with uniform single phase materials, some of which are not clearly understood.

In any event, there is an ever-growing need for novel composite materials that have desirable mechanical and physical properties. The present invention is directed toward addressing those needs.

SUMMARY OF THE INVENTION

Briefly stated, a composite material is provided comprising an elastomer, from about 0.1 wt % to about 15 wt. % of a layered mineral based on the the weight of the total composition and from about 0.1 wt. % to about 15 wt. % of asphalt based on the weight of the total composition.

The compositions of the present invention have improved modulus and are particularly useful in a range of applications including automotive undercoatings, noise absorbing structural material, carpet backing and the like.

DETAILED DESCRIPTION OF THE INVENTION

Figure 1:
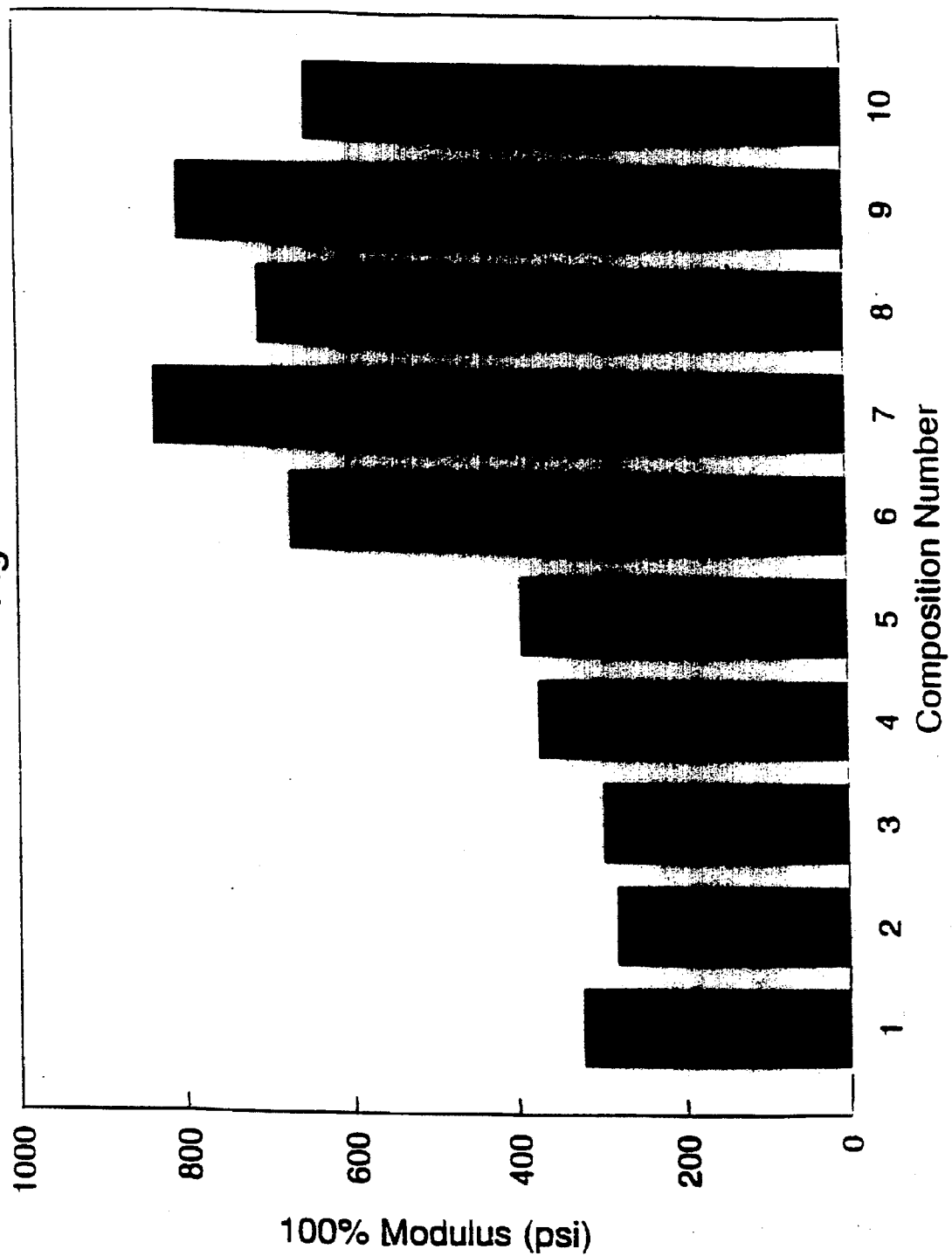
FIGS. 1–3 are bar graphs comparing properties of various composites described in the accompanying examples.

Elastomeric polymers useful in the present invention include conventional elastomers such as polybutadiene, polyisoprene, polyisobutylene, and the like and elastomeric copolymers containing a sufficient quantity of an elastomeric component to give the copolymer a glass transition temperature of less than room temperature and preferably below 25° C. such as between 25° C. and −120° C. Thermoplastic elastomers such styrene-elastomer diblocks, triblocks and radical block copolymers are also useful.

In general the polymers of the composite of the present invention will have number average molecular weights in the range of from about 30,000 to about 600,000 grams per mol. In the case of styrene elastomer copolymers, the styrene content will typically be in the range from about 10 wt. % to about 50 wt. % of the copolymer composition.

Any layered mineral capable of being intercalated may be employed in the present invention, however, layered silicate minerals are preferred. The layered silicate minerals that may be employed in the present invention include natural and artificial minerals capable of forming intercalation compounds. Non-limiting examples of such minerals include smectitite clay, montmorillonite, saporite, beidellite, montronite, hectorite, stevensite, vermiculite, and hallosite. Of these, montmorillonite is preferred.

In the practice of the present invention it is particularly preferred that the layered silicate mineral be modified by having been treated with a swelling agent. As is known, a swelling agent expands the inter layer distance of the layered mineral thereby facilitating the intercalation of the mineral with other materials. Typical swelling agents are onium salts. Particularly preferred swelling agents are hydrocarbyl onium salts represented by the formula $A^-M^+R^1R^2R^3R^4$ and $A^-P_y+R^4$, where $A^-$ denote an anion such as $OH^-$, $NO^-_3$, $SO^-_4$, $Cl^-$ and the like, M denotes N, S or P; $R^1$, $R^2$, $R^3$ and $R^4$ independently denote hydrogen, allyl, or allyl group, which may be the same or different; Py denotes the pyridinium or alkyl substituted pyridinium group.

The amount of swelling agent used in the process of the present invention is not critical; however, in general the amount of swelling agent used will be in the range of from about 10 to about 10,000% of the cationic exchange capacity of the layered mineral and preferably about equal to the exchange capacity of the layered mineral.

The amount layered mineral used in forming the composite is from about 0.1 wt. % to about 15 wt. % based on the total weight of the composite.

The asphalt used in the practice of the present invention has a penetration number, as determined by ASTM test method D-5, of from about 20 to 300 measured at 25° C. and more preferably from about 100 to 250 at 25° C. Optionally, the asphalt may be sulfonated and neutralized, although it is not necessary to sulfonate and neutralize the asphalt. In those instances in which the asphalt is in fact sulfonated and neutralized, the sulfonation and neutralization can be achieved by techniques well known in the art such as that disclosed in U.S. Pat. No. 4,514,308. In general, when using a sulfonated asphalt, the asphalt will contain from about 1 to about 100 meq. of sulfonate groups per 100 grams of asphalt and more preferably from about 5 to about 40 meq. of sulfonate groups. These sulfonate groups maybe neutralized with ammonia, amines and bases that contain cations selected from groups IA, IIA, IIIA and groups IB of the Periodic Table of the Elements. The Periodic Table of the Elements referred to herein is that found in the inside cover of "Lange's Handbook of Chemistry", eleventh edition McGraw Hill Book Co. (1973). A preferred neutralizing agent is one that contains divalent cations, especially zinc, calcium, barium and magnesium. The degree of neutralization of the sulfonated asphalt may vary widely but generally will be greater than 80 mol. % up to 100 mol. %.

The amount of asphalt in the composition of the present invention will generally be in the range of about 0.1 wt. % to about 15 wt. % based on the the total weight of the composite.

The composites of the present invention are prepared by combining the layered mineral, the elastomeric polymer and the asphalt in the desired ratios. Basically, the components can be blended by general techniques known to those in the art. For example, the components can be blended in the solution and subsequently isolated or they can be blended, melted in mixers such as Brabender and the like. It is particularly preferred to blend the materials in a melt.

The invention will be further described in the examples which follow.

EXAMPLES

Example 1

This example illustrates the technique for preparing a neutralized sulfonated asphalt used in the composites herein. 392.5 g of a Cold Lake 300/400 Pen asphalt were placed in a resin flask and heated to 160° C. The asphalt was continuously stirred with a high speed stirring arrangement and also blanketed with nitrogen gas. 4.40 mls of sulfuric acid dissolved in 4.40 mls of water were added dropwise with stirring for 60 minutes. Subsequently, 2.24 g calcium oxide was added to the functionalized asphalt with stirring (30 minutes). A nitrogen gas bubbler was inserted to remove water. Stirring was continued for a 2.0 hour time period. The calcium neutralized sulfonated asphalt was recovered (389.9 g).

Example 2

A series of compositions were prepared using a linear styrene-butadiene-styrene block copolymer (28 wt. % styrene) as the elastomer and either an unsulfonated asphalt or a sulfonated asphalt. Bentone-34 which is a dialkylammonium modified montmorillonite clay sold by Rheox Corporation, Hightstown, N.J., was the layered material employed. The sulfonated asphalt used was prepared as described in Example 1. The amount of clay and asphalt used for various compositions is shown in Table 1 below. The first six compositions are included for comparative purposes:

TABLE 1

| Composition No | Clay, Wt. % | Asphalt, Wt. % |
|---|---|---|
| 1 | 0% | 0 |
| 2 | 0% | Unsulfonated, .9% |
| 3 | 0% | Sulfonate 9% |
| 4 | 0% | Unsulfonated, 5% |
| 5 | 0% | Sulfonate, 5% |
| 6 | 10% | 0% |
| 7 | 10% | Unsulfonated, 9% |
| 8 | 10% | Unsulfonated, 5% |
| 9 | 10% | Sulfonate 2, .9% |
| 10 | 10% | Sulfonate 2, .5% |

In all instances, the compositions were melt processed in a Brabender mixer heated at 160° C. The materials were mixed for 5 minutes at 100 RPM. The material was cooled to room temperature, cut into small pieces and subsequently compression molded (160° C.) into tensile specimens.

The blends were formed into final form via compression molding into approximately 2"×2"0.02" pads using the following conditions; 2 minute preheat at 160° C., followed by 3 minute process cycle at 29 tons (160° C.) and finally 4 minute cooling to room temperature (again at 29 tons pressure). The appropriate sized sample for the tensile testing measurements are cut from these pads.

The mechanical properties were obtained from an Instron® Tensile Tester with a clamp speed of 20 in/min.

The mechanical properties, are markedly enhanced with the addition of low levels of functionalized and unfunctionalized asphalt and layered silicate. The data for the various compositions are shown in FIG. 1. As can be seen the presence of both asphalt and layered silicate increases the modulus of the elastomer.

Example 3

Figure 2:
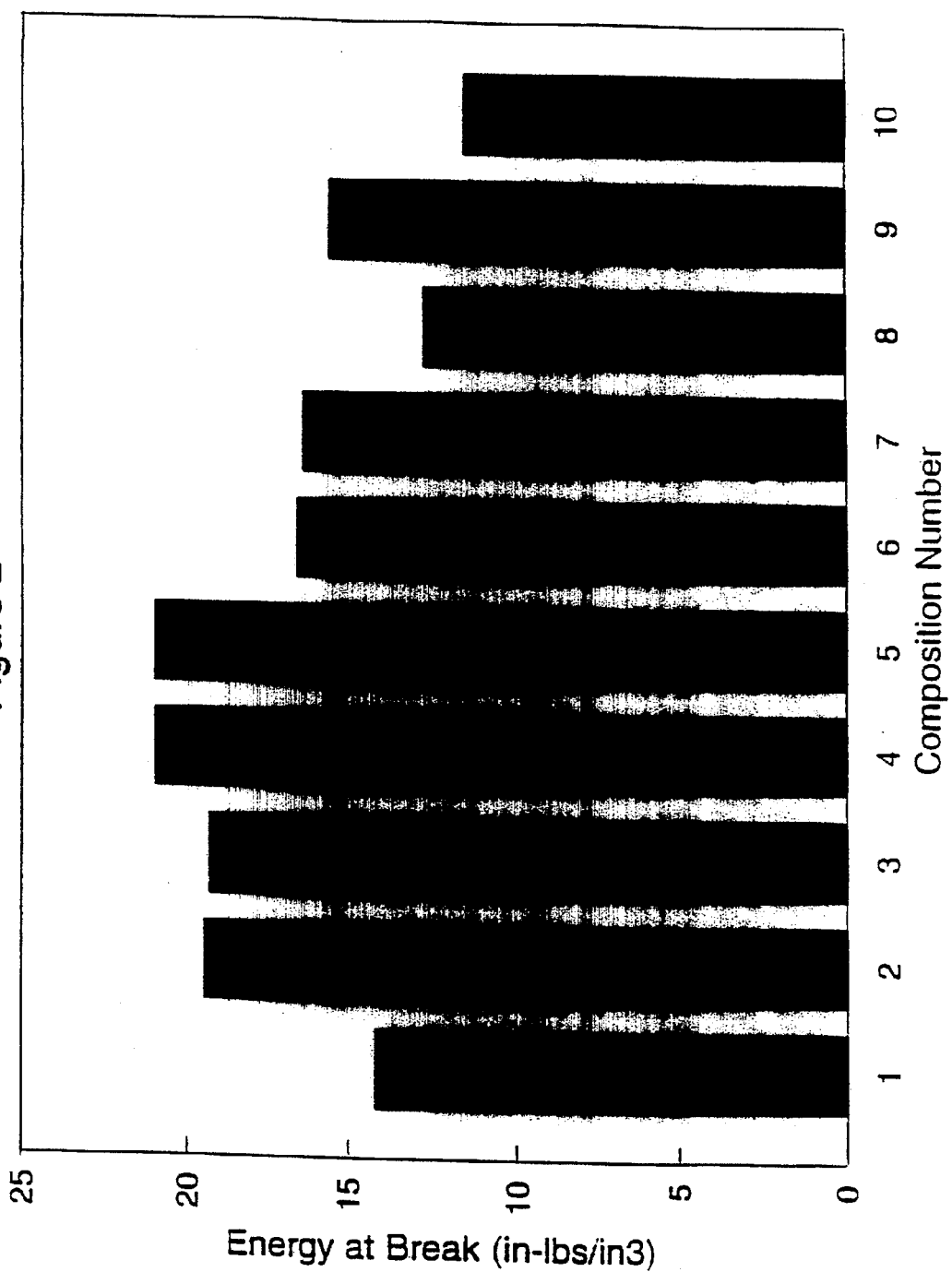

The energy to break for the compositions in Table 1 was determined through the integration of the area under the stress-strain curve for each composition. The detailed data is presented in FIG. 2. In this figure, the energy to break is plotted as a function of material composition. The data shows a marked improvement in with the addition of a large amount of layered silicate in combination with the asphalt.

Example 4

Another series of compositions were prepared using a linear styrene-butadiene-styrene block copolymer (45 wt. % styrene) as the elastomer. As in Example 2, Betone-34 was used as the layered material and the sulfonated asphalt used was prepared as described in Example 1. The compositions are given in Table 2 below, the first three of which are included for comparative purposes.

TABLE 2

| Composition No. | Clay Wt. % | Asphalt, Wt. % |
|---|---|---|
| 1 | 0% | Unsulfonated 1, .9% |
| 2 | 0% | Sulfonate 2, .9% |
| 3 | 10% | 0% |
| 4 | 10% | Unsulfonated, .9% |
| 5 | 10% | Sulfonate 2, .9% |

Figure 3:
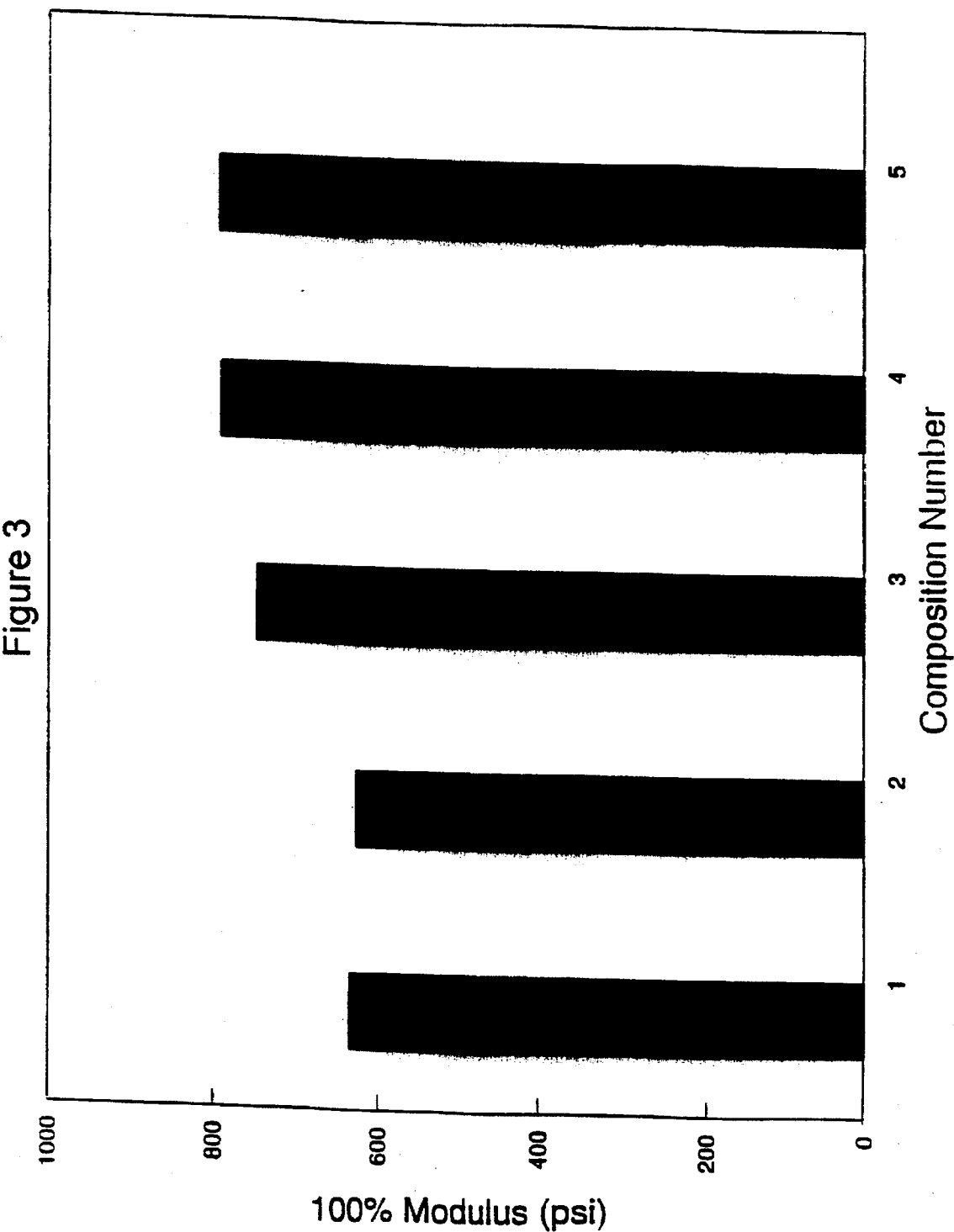

The blends were made following the procedures of Example 2 and tested as described therein. The data is presented in FIG. 3. As can be seen, the modulus of this normally rigid material is improved by the addition of layered silicate and asphalt.

What is claimed is:

1. A composite, comprising:
   an elastomer having a Tg of less than 25° C.;
   a layered mineral in an amount ranging from about 0.5 to about 15 wt % based on the total weight of the composite capable of forming an intercalation compound; and
   an asphalt in an amount ranging from about 0.1 wt % to about 15 wt % based on the total weight of the composite, wherein the asphalt has a penetration number as determined by ASTM Method D-5 at 25° C. of from about 20 to about 300.

2. The composite of claim 1, wherein the elastomer has a number average molecular weight in the range of about 30,000 to 600,000 gms./mol.

3. The composite of claim 2, wherein the asphalt is sulfonated and neutralized.

4. The composite of claim 1 wherein the layered mineral is selected from the group consisting of smectitic clay, montmorillonite, saporite, beidellite, montronite, hectorite, stensite, vermiculite, and hallosite.

5. The composite of claim 3 wherein the elastomer is a styrene-butadiene copolymer having a styrene content in the range of about 10 wt. % to about 50 wt. %.

6. The composite of claim 4, wherein the asphalt is sulfonated and neutralized.

7. A composite comprising:
   an elastomer having a Tg of less than 25° C.;
   a layered mineral in amount ranging from about 0.5 wt % to about 15 wt % based on the total weight of the composite, the layered mineral having been modified with a hydrocarbyl onium ion swelling agent to form an intercalation compound; and
   from about 0.1 wt % to about 15 wt % based on the total weight of the composition of an asphalt or sulfonated asphalt wherein the asphalt has a penetration number as determined by ASTM Method D-5 at 25° C. of from about 20 to about 300.

* * * * *